(12) United States Patent
Liang et al.

(10) Patent No.: US 8,717,310 B2
(45) Date of Patent: May 6, 2014

(54) STYLUS

(75) Inventors: Shi-Xu Liang, Shenzhen (CN); Jun-Lin Chen, Shenzhen (CN); Chung-Yeh Sa, Santa Clara, CA (US)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 897 days.

(21) Appl. No.: 12/814,561

(22) Filed: Jun. 14, 2010

(65) Prior Publication Data
US 2011/0139519 A1 Jun. 16, 2011

(30) Foreign Application Priority Data

Dec. 16, 2009 (CN) .......................... 2009 1 0311650

(51) Int. Cl.
*G06F 3/033* (2013.01)
(52) U.S. Cl.
USPC ........... 345/173; 345/174; 345/175; 345/176; 345/177; 345/183; 178/18.01; 178/18.02; 178/18.03; 178/18.04; 178/18.05; 178/18.06; 178/18.07; 178/18.08; 178/18.09; 178/18.11
(58) Field of Classification Search
USPC ................. 345/173–183, 156–157; 178/18.01–18.11, 19.01–20.04
See application file for complete search history.

(56) References Cited

U.S. PATENT DOCUMENTS

| | | | | |
|---|---|---|---|---|
| 6,014,552 A | * | 1/2000 | Aiken et al. ................ | 455/575.1 |
| 2003/0077103 A1 | * | 4/2003 | Kim ................................. | 401/68 |
| 2003/0184529 A1 | * | 10/2003 | Chien et al. .................... | 345/179 |
| 2006/0094463 A1 | * | 5/2006 | Eom .......................... | 455/556.1 |
| 2006/0094464 A1 | * | 5/2006 | Kyou et al. ................ | 455/556.1 |
| 2009/0231301 A1 | * | 9/2009 | Chang et al. .................. | 345/174 |
| 2009/0273573 A1 | * | 11/2009 | Hotelling ...................... | 345/173 |

FOREIGN PATENT DOCUMENTS

CN 1770551 A 5/2006

* cited by examiner

*Primary Examiner* — Alexander S Beck
*Assistant Examiner* — Jeffrey Steinberg
(74) *Attorney, Agent, or Firm* — Novak Druce Connolly Bove + Quigg LLP

(57) ABSTRACT

A stylus comprises a first shell, a second shell, a first slide enabling member. The first shell has a first hole defined therethough. The second shell is slidably accommodated in the first hole of the first shell. The first slide enabling member couples the second shell to the first shell such that the second shell slides relative to the first shell from a retracted configuration to an extending configuration. The first slide enabling member includes a first pin and a first track that engages the first pin, the second shell slides relative to the first shell along the first pin.

7 Claims, 6 Drawing Sheets

STYLUS

BACKGROUND

1. Technical Field

This exemplary disclosure generally relates to writing complements, and particularly to retractable/extendable styluses.

2. Description of Related Art

It is well-known that a variety of devices include a touch screen. Examples of such devices include smart phones, personal digital assistants (PDA), pagers, personal organizers, and the like. These devices typically include a display module under the touch screen. The display module generates target images associated with menu options, programs, user choices, and other operations. The user controls the device by pressing the touch screen over the target image with a stylus. However, typical styluses can be inconvenient to retract or extend.

Therefore, there is room for improvement within the art

BRIEF DESCRIPTION OF THE DRAWINGS

Many aspects of the exemplary stylus can be better understood with reference to the following drawings. The components in the various drawings are not necessarily drawn to scale, the emphasis instead being placed upon clearly illustrating the principles of the exemplary stylus. Moreover, in the drawings, like reference numerals designate corresponding parts throughout the diagrams.

DETAILED DESCRIPTION OF THE EXEMPLARY EMBIDOMENT

In this exemplary embodiment, the stylus is used to contact a touch screen display of an electronic device such as a mobile telephone. The mobile telephone described herein is a representation of the type of wireless communication device that may benefit from the exemplary embodiment. However, it is to be understood that the exemplary embodiment may be applied to any type of hand-held or portable device including, but not limited to, the following devices: radiotelephones, cordless phones, paging devices, personal digital assistants, portable computers, pen-based or keyboard-based handheld devices, remote control units, portable media players (such as an MP3 or DVD player) that have wireless communication capability and the like. Accordingly, any reference herein to the mobile telephone should also be considered to apply equally to other portable wireless electronic devices.

Figure 1:
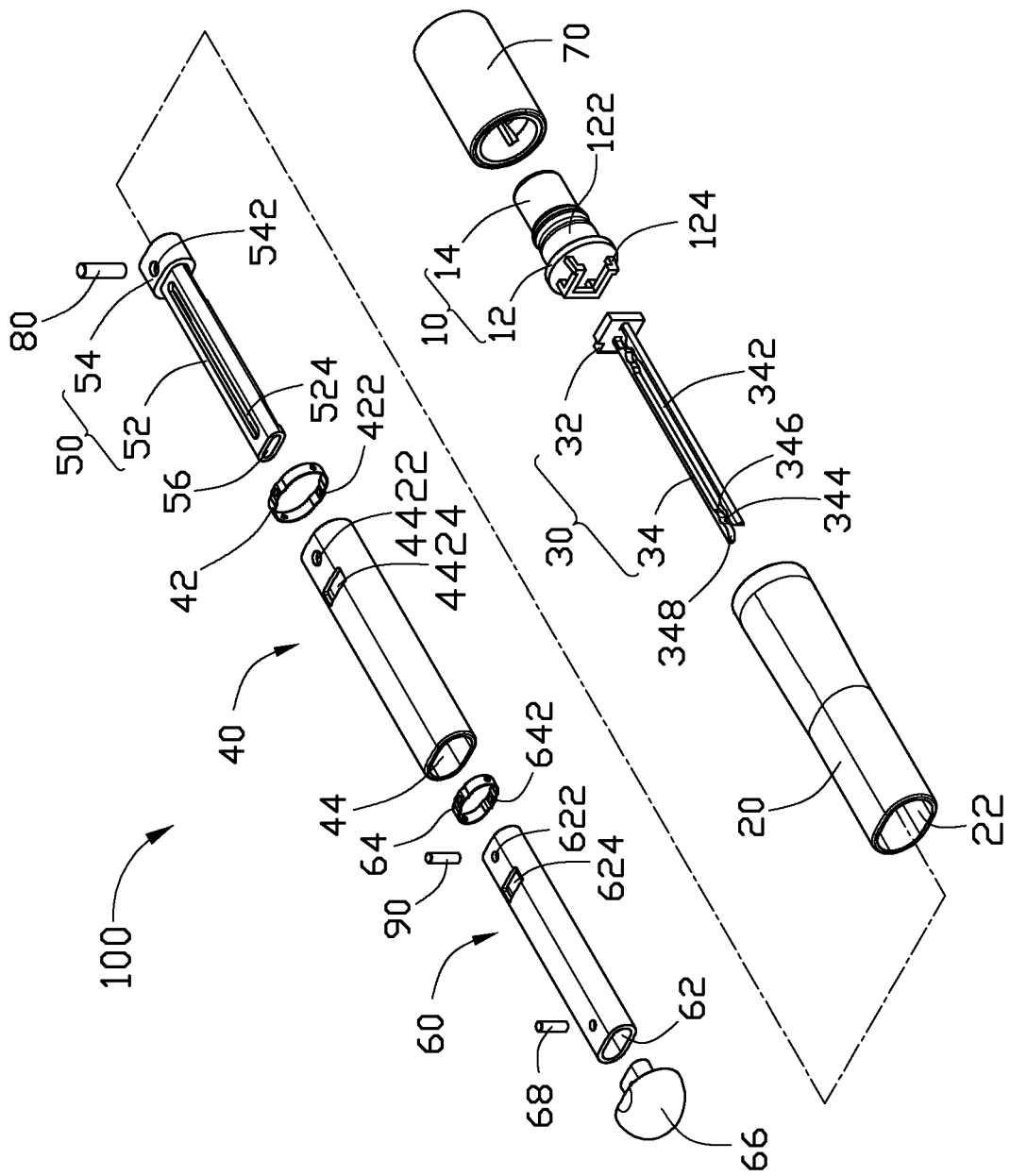
FIG. 1 is an exploded view of an exemplary stylus.
Figure 2:
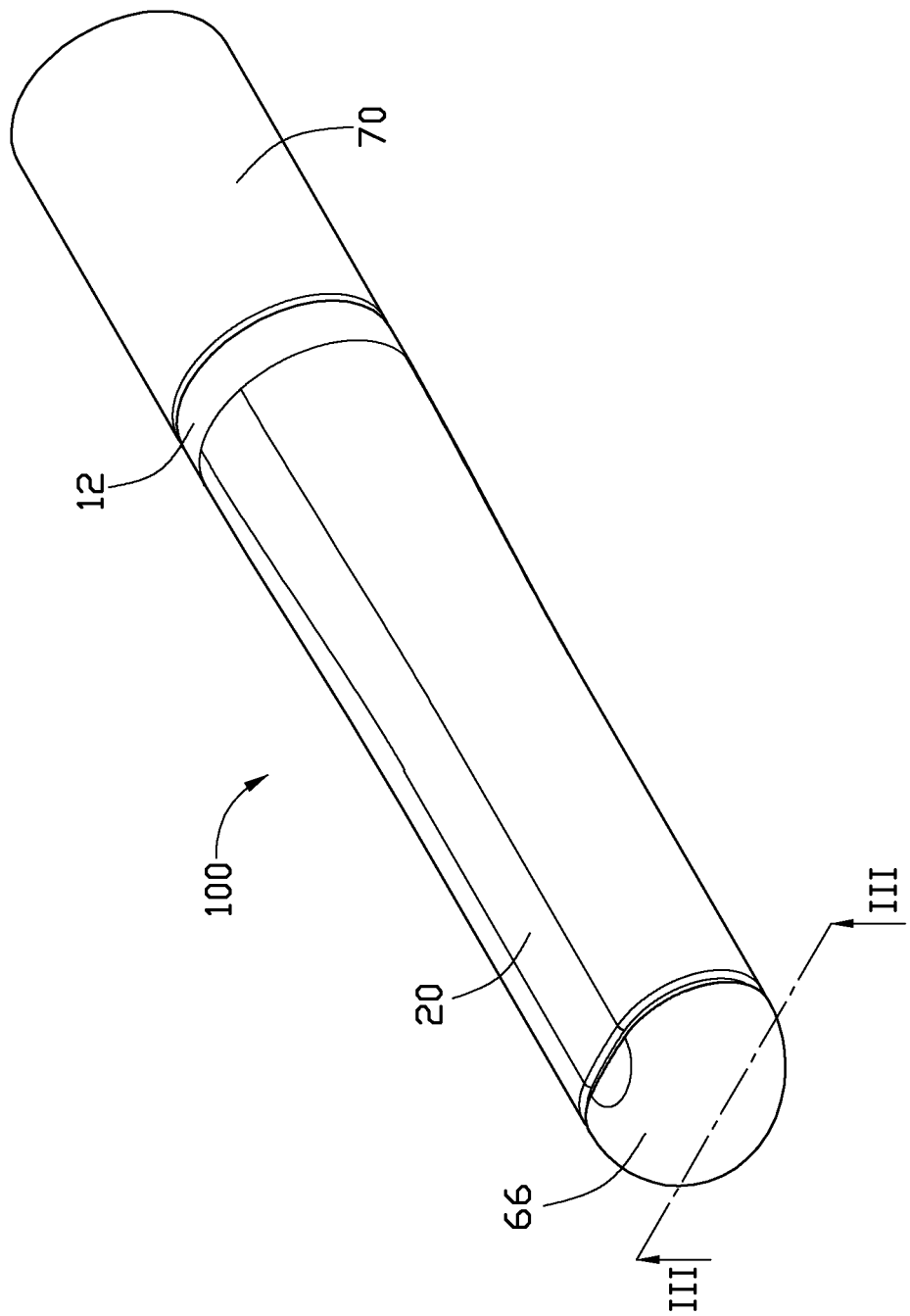
FIG. 2 is an assembled view of the stylus shown in FIG. 1.

Referring to FIGS. 1 and 2, a stylus 100 includes a first shell 20, a head 10 integrally formed on one end of the first shell 20, a second shell 40, a third shell 60 and a cap 70. The second shell 40 is slidably coupled to the first shell 20 by a first slide enabling member, and the third shell 60 is slidably coupled to the second shell 40 by a second slide enabling member. In a retracted or closed configuration 200 shown in FIG. 3, the second shell 40 is retracted in the first shell 20 and the third shell 60 is retracted in the second shell 40 such that the stylus 100 is shortened to improve the portability of the stylus 100. In an extended configuration 300 shown in FIG. 5, the second shell 40 is extended out of the first shell 20 and the third shell 60 is extended out of the second shell 40 such that the stylus 100 is lengthened to improve the convenience of using the stylus 100.

The first shell 20 is tubular and of any suitable manufacture, and may for example be constructed of a lightweight metal such as stainless steel or aluminum alloy. The first shell 20 is hollow, having a first hole 22 defined longitudinally therethrough.

Figure 3:
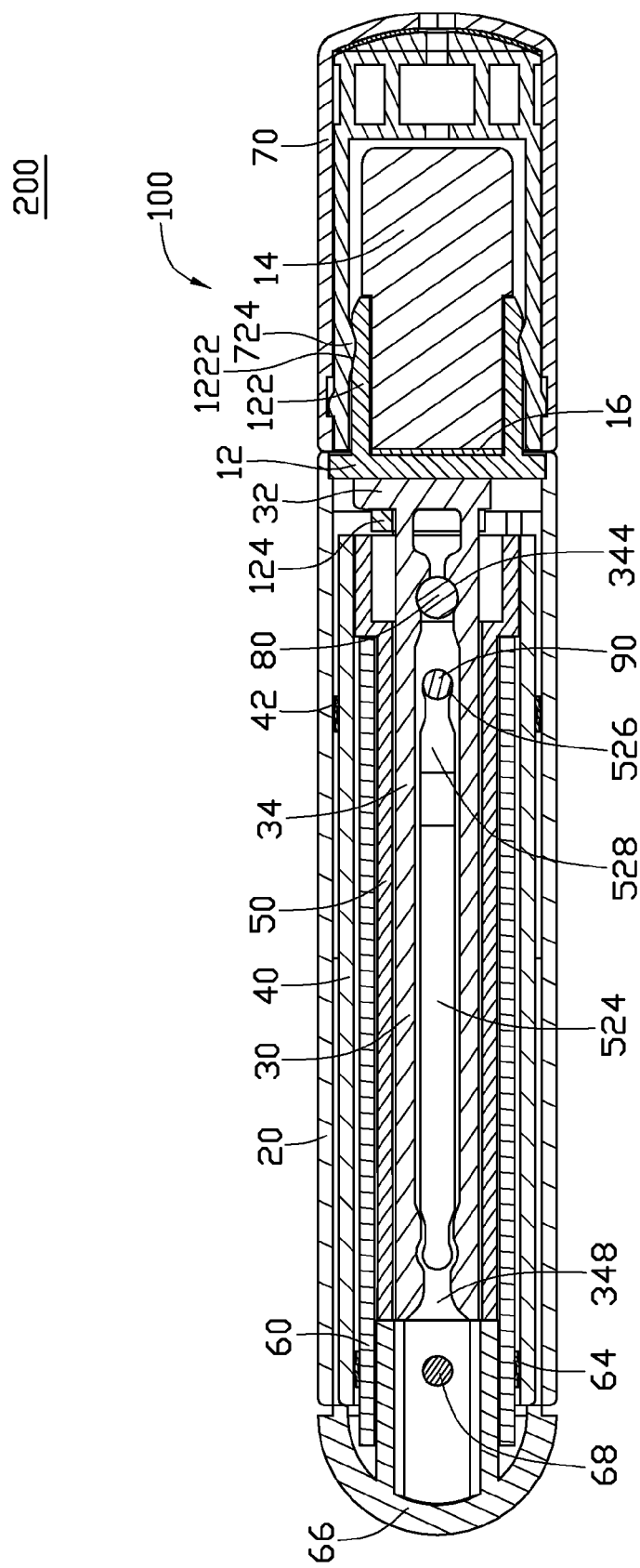
FIG. 3 is a cross-sectional view of the stylus in FIG. 2 along the line III-III, and wherein the stylus is in a close position.

The head 10 be of any suitable manufacture, and may for example be constructed of a lightweight metal such as stainless steel or aluminum alloy. Referring to FIG. 3, the head 10 is tightly fitted within the first hole 22 of the first shell 20 and located at one end of the first shell 20. The head 10 is used to contact a touch screen display of an electronic device. The head 10, in this embodiment, may include a main body 12 and a tip 14 which are coupled together by a glue 16, e.g., a conductive glue 16. The main body 12 has the same shape and size as the first hole 22 of the first shell 20 such that the main body 12 can be tightly fitted in the first hole 22 to secure the head 10 to the first shell 20. The head 10 further includes a mounting portion 122 that may be a tubular member positioned at one end of the main body 12, and a latching portion 124 which may be a L-shaped hook positioned at another end of the main body 12 opposite to the mounting portion 122. The mounting portion 122 is configured to tightly accommodate the tip 14 therein to assist the glue 16 mounting the tip 14 on the main body 12, such that the tip 14 can be firmly coupled to the main body 12. The head 10 further includes a retaining slot 1222 defined at an outer surface of the mounting portion 122. The cap 70 has a protrusion 724 protruding from an inner surface thereof corresponding to the retaining slot 1222. The protrusion 724 is rested in the retaining slot 1222 while the cap 70 is cover on the head 10, firmly holding the cap 70 on the head 10 to protect the head 10.

The second shell 40 is tubular and has the same shape as, but is slightly smaller than the first hole 22 of the first shell 20 such that the second shell 40 can be slid in the first hole 22 relative to the first shell 20 between the retracted configuration 200 and the extended configuration 300. The second shell 40 includes a second hole 44 defined therethrough and two aligned troughs 4422 defined at one end thereof. The second shell 40 is of any suitable manufacture, and may for example be constructed of a lightweight metal such as stainless steel or aluminum alloy.

The third shell 60 is tubular and has the same shape as, but is slightly smaller than the second hole 44 of the second shell 40 such that the third shell 60 can be slid in the second hole 44 relative to the second shell 40 between the retracted configuration 200 and the extended configuration 300. The third shell 60 includes a third hole 62 defined therethrough, two aligned voids 622 defined at one end thereof, and an operating portion 66 located at another end thereof by a positioning pin 68. The operating portion 66 is configured for facilitating using the stylus 100 as described in greater detail hereinbelow. The third shell 60 is of any suitable manufacture, and may for example be constructed of a lightweight metal such as stainless steel or aluminum alloy.

Referring to FIGS. 1 and 3, the first slide enabling member is provided for the second shell 40 to slidably engage the first shell 20. The first slide enabling member, in this embodiment, may include a first pin 80 and a first track 342 that engages the first pin 80. The first pin 80 is positioned in the troughs 4422 of the second shell 40 and the first track 342 is a guiding groove defined in a guiding element 30 that is retained on the head 10 and located in the first hole 22 of the first shell 20. The guiding element 30 includes a retaining board 32 and two guiding portions 34 spacingly extending from one end of the retaining board 32. The retaining board 32 is latched in the latching portion 124 of the head 10 to mount the guiding element 30 to the head 10, and the head 10 is mounted to the first shell 20 as mentioned above, so the guiding element 30 is mounted to the first shell 20, i.e., the first track 342 is defined in the first shell 20. In another embodiment, the retaining board 32 may be directly mounted to the first shell 20 to mount the guiding element 30 directly to the first shell 20. The first track 342 is defined between the guiding portions 34. The first pin 80 is slid in the first track 342 when the second shell 40 slides relative to the first shell 20. It is understood that one of ordinary skill in the art would appreciate the first slide enabling member that comprises the first pin 80 and the first track 342 are one example. It is also understood that the first pin 80 may be carried on either the first shell 20 or the second shell 40 and the first pin 80 engaging members (e.g. first track 342) may be carried on the element that the first pin 80 are not carried on.

The first slide enabling member further includes two first stopping holes 344 that are located respectively at opposites ends of the first track 342 and communicate with the first track 342. The first stopping holes 344 are configured to hold the second shell 40 in the retracted configuration 200 or the extended configuration 300. Each first stopping hole 344 is defined between the guiding portions 34 and communicates with the first track 342 by a slit 346 located between the first stopping holes 344 and the first track 342. The first stopping holes 344 are sized and dimensioned to tightly fit the first pin 80 therein when the second shell 40 is slid to the retracted configuration 200 shown in FIG. 3 and/or the extended configuration 300 shown in FIG. 4, and the slits 346 are smaller than the first pin 80 such that the first pin 80 can not freely slide out of the first stopping holes 344 when the first pin 80 is fit in the first stopping holes 344. Thus, the second shell 40 can be firmly held in the retracted configuration 200 and the extended configuration 300 by the tight fit engagement between the first stopping holes 344 and the first pin 80. The first slide enabling member may include a guiding slot 348 defined at a distal end of the guiding portions 34 communicating with the first stopping hole 344. The guiding slot 348 is used for guiding the first pin 80 into the first stopping hole 344.

The second slide enabling member is provided for the third shell 60 to slidably engage the second shell 40. The second slide enabling member, in this embodiment, may include a second pin 90 and a second track 524 that engages the second pin 90. The second pin 90 is positioned in the voids 622 of the third shell 60 and the second track 524 is a guiding groove defined in a sliding element 50 that is retained on second shell 40 by the first pin 80. The sliding element 50 includes a retaining portion 54 and an elongate portion 52 protruding from one end of the retaining portion 54. The retaining portion 54 has two aligned retaining holes 542 that are sized and dimensioned to tightly fit the first pin 80 therein when the first pin 80 is accommodated in the retaining holes 542, such that the sliding element 50 is mounted to the second shell 40. The second track 524 is defined longitudinally through the elongate portion 52. The second pin 90 is slid in the second track 524 when the third shell 60 slides relative to the second shell 40. The sliding element 50 may includes an opening 56 defined therethough such that the guiding portions 34 of the guiding element 30 is slid in the opening 56 when the first pin 80 slides relative to the guiding element 30.

The second sliding mechanism further includes two second stopping holes 526 that are located respectively at two opposites ends of the second track 524 and communicate with the second track 524. The second stopping holes 526 are configured to hold the third shell 60 in the retracted configuration 200 or the extended configuration 300. Each second stopping hole 526 is defined through the elongate portion 52 and communicates with the second track 524 by a gap 528 located between the second stopping holes 526 and the second track 524. The second stopping holes 526 are sized and dimensioned to tightly fit the second pin 90 therein when the third shell 60 is slid to the retracted configuration 200 shown in FIG. 3 and/or the extended configuration 300 shown in FIG. 4, and the gaps 528 are smaller than the second pin 90 such that the second pin 90 can not freely slide out of the second stopping holes 526 when the second pin 90 is fit in the second stopping members. Thus, the second shell 40 can be firmly held in the retracted configuration 200 and the extended configuration 300 by the tight fit engagement between the second shopping holes 526 and the second pin 90.

The stylus 100 further includes a first conductive ring 42 and a second conductive ring 64. The first conductive ring 42 is coupled between the first shell 20 and the second shell 40 for conducting electrically the first shell 20 and the second shell 40. The second conductive ring 64 is coupled between the second shell 40 and the third shell 60 for conducting electrically the second shell 40 and the third shell 60 when the stylus 100 is used to a capacitance-type touch-panel. In this embodiment, the second shell 40 further has two aligned first catches 4424 positioned near the troughs 4422 for accommodating the first conductive ring 42, and the third shell 60 further has two aligned second catches 624 positioned near the voids 622 for accommodating the second conductive ring 64, such that the first conductive ring 42 can be firmly mounted between the first shell 20 and the second shell 40, and the second conductive ring 64 can be firmly mounted between the second shell 40 and the third shell 60.

Figure 6:
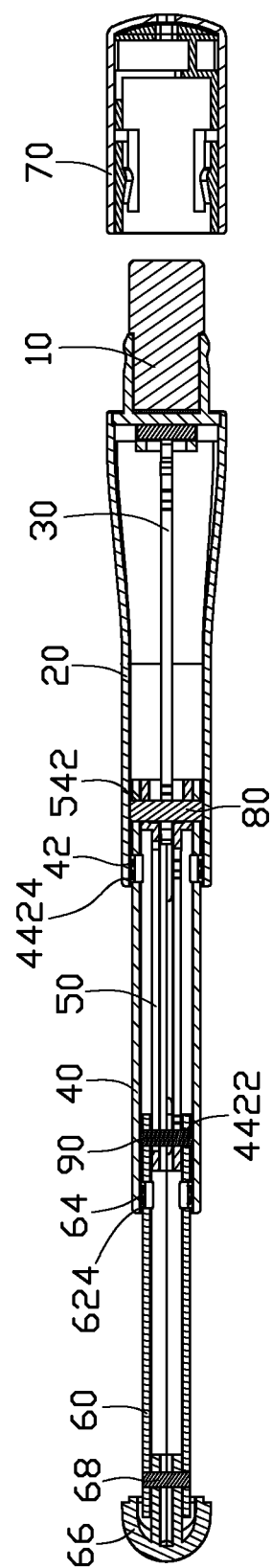
FIG. 6 is another cross-sectional view of the stylus in FIG. 2 but showing the stylus in an open position.

Referring to FIGS. 1, 3 and 6, to assemble the stylus 100, the tip 14 is first inserted into the mounting portion 122 by the glue 16. The retaining board 32 of the guiding element 30 is then latched in the latching portion 124 of the head 10, to mount the guiding element 30 to the head 10. The main body 12 of the head 10 is then attached to the first hole 22 of the first shell 20 using a suitable means, such as heat staking, an adhesive, fasteners, or the like. The first conductive ring 42 is wound around the second shell 40 at the first catches 4424, the second conductive ring 64 is wound around the third shell 60 at the second catches 624.

The sliding element 50 is then inserted in the third hole 62 of the third shell 60 until the second track 524 of the sliding element 50 is aligned with the void 622 of the third shell 60. The second pin 90 is then inserted into the voids 622 and the second track 524. At this motion, two ends of the second pin 90 are tightly retained in the voids 622 so that the second pin 90 is mounted to the third shell 60, and the center portion of the second pin 90 is positioned in the second track 524, and there is a sufficient clearance between the sides of the second track 524 and the second pin 90 so that the second pin 90 may move freely. After that, the third shell 60 is slid relative to the sliding element 50 until the second pin 90 is positioned in the second stopping hole 526 like shown in FIG. 3 such that the third shell 60 is firmly mounted to the sliding element 50.

The sliding element 50 combined with the third shell 60 is inserted in the second hole 44 of the second shell 40 until the retaining hole 542 of the sliding element 50 is aligned with the troughs 4422 of the second shell 40. The first pin 80 is then inserted into the troughs 4422 and the retaining hole 542. At this motion, two ends of the first pin 80 are tightly retained in the troughs 4422 and the retaining holes 542 and so that the sliding element 50 is mounted to the second shell 40.

The second shell 40 is inserted into the first hole 22 of the first shell 20. At this motion, the first pin 80 passes through the guiding slot 348, the first stopping hole 344 adjacent to the guiding slot 348, the slit 346, the first track 342, until the first pin 80 is positioned in another first stopping hole 344 like shown in FIG. 3. Finally, the cap 70 is cover on the head 10 to complete assembly of the stylus 100.

Figure 4:
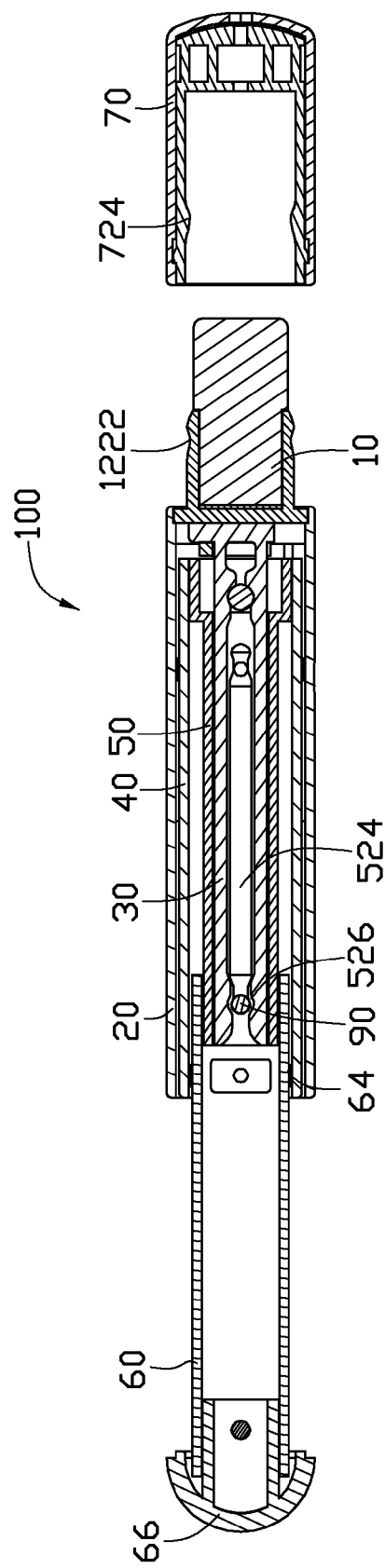
FIG. 4 is similar to FIG. 3, but showing the stylus in an intermediate position.
Figure 5:
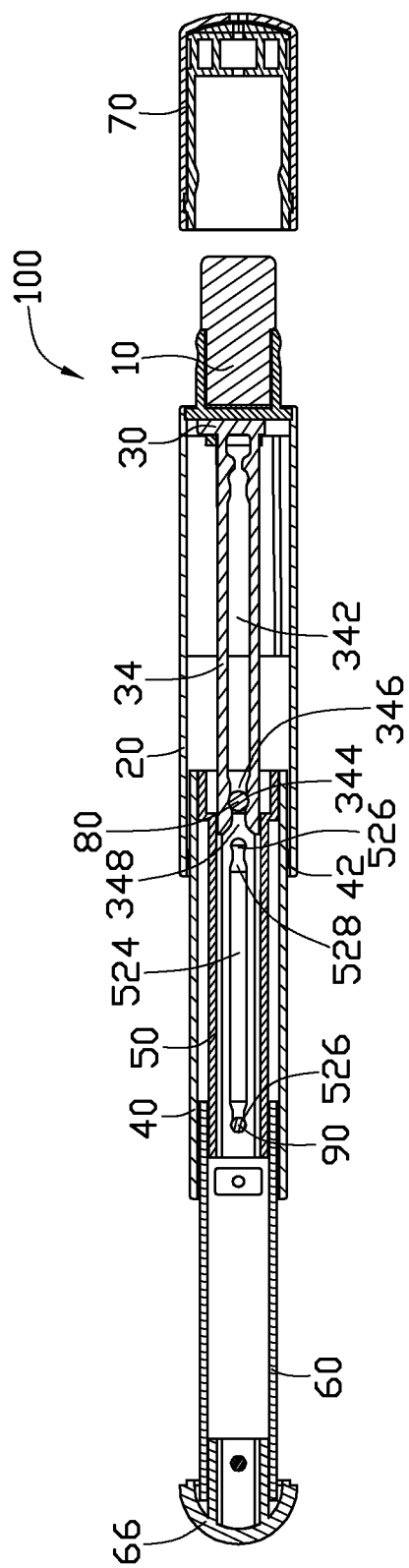
FIG. 5 is similar to FIG. 3, but showing the stylus in an open position.

Referring to FIGS. 3 to 5, in operation, the operating portion 66 of the third shell 60 is dragged away from the sliding element 50 until the second pin 90 is slid out of the second stopping hole 526. The second pin 90 is then slid in the second track 524 of the sliding element 50 toward the other second stopping hole 526. Once the second pin 90 is positioned in the other second stopping hole 526, the stylus 100 is positioned in an intermediate position shown in FIG. 4. Then, the third shell 60 is continuously dragged away from the sliding element 50, to drive the second shell 40 slid relative to the guiding element 30. During this course, the first pin 80 is slid out of the first stopping hole 344 and sliding into the first track 342 of the guiding element 30 until to the other first stopping hole 344. Once the first pin 80 is positioned in the other first stopping hole 344, the stylus 100 is fully extended, i.e., is positioned in the extended configuration 300 shown in FIG. 5. Then, the cap 70 is removed from the head 10 such that the stylus 100 is ready to use.

It is to be understood that the cap 70 may be removed from the head 10 at the intermediate position shown in FIG. 4, such that a user can use the stylus 100 in the intermediate position.

It is to be further understood that even though numerous characteristics and advantages of the exemplary embodiments have been set forth in the foregoing description, together with details of structures and functions of various embodiments, the disclosure is illustrative only, and changes may be made in detail, especially in matters of shape, size, and arrangement of parts within the principles of the exemplary invention to the full extent indicated by the broad general meaning of the terms in which the appended claims are expressed.

What is claimed is:

1. A stylus, comprising:
a head including a latching portion;
a first shell, the head secured to one end of the first shell;
a second shell slidably accommodated in first shell and selectively extending out of the first shell;
a guiding element retained in the first shell and including a retaining board and two guiding portions spacingly extending from one end of the retaining board, the retaining board latched in the latching portion, a first track defined between the two guiding portions along sliding direction of the second shell; and
a first pin positioned in the second shell and slidably engaging with the first track to make the second shell slides relative to the first shell;
wherein the head includes a main body, a tip, a mounting portion positioned at one end of the main body, the latching portion is positioned at the other end of the main body opposite to the mounting portion, the tip is retained on the mounting portion, a conductive glue is positioned between the tip and the main body to adhere the tip to the main body.

2. The stylus as claimed in claim 1, wherein the guiding element includes two first stopping holes located respectively at two opposites ends of the first track, the first stopping holes retain the second shell in the retracted configuration or the extended configuration.

3. The stylus as claimed in claim 2, wherein the first stopping holes are sized and dimensioned to tightly fit the first pin therein when the second shell is slid to the retracted configuration or the extended configuration.

4. The stylus as claimed in claim 3, wherein the guiding element further includes two slits located between the first track and the first stopping holes, the slits are smaller than the first pin such that the first pin can not freely slide out of the first stopping holes when the first pin is fit in the first stopping holes.

5. The stylus as claimed in claim 2, wherein the guiding element further includes a guiding slot defined at a distal end communicating with one of the first stopping holes; the guiding slot guides the first pin into the one of the first stopping holes.

6. The stylus as claimed in claim 1, wherein the stylus further includes a third shell, a second pin and a sliding element, the third shell slidably received in the second shell; the sliding element defines a second track, the second pin is positioned on the third shell and slidably engaging with the second track to make the third shell slides relative to the second shell.

7. The stylus as claimed in claim 6, wherein the sliding element includes two second stopping holes located respectively at two opposites ends of the second track and communicate with the second track; the second stopping holes hold the third shell in the retracted configuration and the extended configuration.

* * * * *